United States Patent Office 2,806,815
Patented Sept. 17, 1957

2,806,815
STABILIZED HYALURONIDASE

Heron Orlando Singher, Plainfield, and Richard Stanley Lowy, Scotch Plains, N. J., assignors to Ortho Pharmaceutical Corporation, a corporation of New Jersey No Drawing. Application April 12, 1955,
Serial No. 501,001

5 Claims. (Cl. 195—63)

This invention relates to the stabilization of hyaluronidase and more particularly relates to the stabilization of aqueous hyaluronidase solutions by the addition thereto of a water-soluble metal-combining substance having a stability constant for metals greater than that of hyaluronidase, and to the enhancement of the stability of stabilized aqueous hyaluronidase solutions by the addition of a neutral salt.

Hyaluronidase in dry form retains its activity and is stable for long periods of time; however, hyaluronidase in aqueous solution rapidly loses activity, substantially all activity being lost after storage for one month at room temperature. The addition of a neutral salt such as sodium chloride to an aqueous solution of hyaluronidase increases the stability but such a solution loses all activity in about two months at room temperature.

McCullagh, Cassidy, Valentine and Tolksdorf reported in a publication entitled "The Stability and the Stabilization of Testicular Hyaluronidase," Proc. Soc. Exp. Biol. and Med., volume 71, pages 295–298 (1949), that the addition of human plasma to hyaluronidase dried in vials from the frozen state acted as a stabilizer and that a polypeptide derived from gelatine stabilized hyaluronidase dried in vials from the frozen state. The same investigators studied the stability of dilute enzyme solutions and reported that with two preparations, assaying 150 and 500 TRU per milligram respectively, the 500 TRU material at a concentration of 0.28 mg. per ml. lost 50 percent of its activity in seven weeks whereas at the same temperature, in the presence of 2 mg. of polypeptide per ml., there was no loss in activity over the same period of time. At room temperature, the half-life of hyaluronidase in dilute aqueous solution was found to be seven days in the absence of stabilizer and eighteen days in the presence of polypeptide derived from gelatine.

It has now been discovered that dilute aqueous solutions of hyaluronidase may be stabilized by the addition of compounds capable of forming complexes with heavy metals which have stability constants for metals greater than that of hyaluronidase. It has also been discovered that the stabilizing effects of compounds capable of forming complexes with heavy metals is enhanced in the presence of neutral inorganic salts.

Substances having the ability to form complexes with heavy metals which are suitable for use in the practice of this invention have a solubility in water of isotonic saline solution sufficient to provide a solution having a molarity with respect thereto of from about 0.2 to about 0.1. If the molarity of the solution is below about 0.02, the combining capacity with heavy metals is not sufficient and if the molarity of the substance is above about 0.1 the stability of the hyaluronidase is not substantially enhanced and this is probably due to electrostatic interactions which occur between the stabilizing agent and hyaluronidase. Stabilizing agents capable of forming complexes with heavy metals which have been found suitable include amino acids such as glycine, alpha-alanine, valine, leucine, asparagine, proline, hydroxyproline, glutanine, threonine, epsilon-aminocaproic acid, and histidine; peptides such as diglycine and triglycine; amino acid derivatives such as glycol-glycine amide, sarcosine, betaine, taurine; and a lower aliphatic acid substituted diamine such as ethylene diamine; di-, tri-, or tetra-acetic acid. The preferred stabilizing agent is glycine at a molarity in the aqueous hyaluronidase solution of about 0.075.

Stability constants which are a measure of the avidity of substances to form stable complexes with the ions of heavy metals have been reported by A. Albert, Biochemical Journal, volumes 47 and 50, pages 531–538 and pages 690–697.

The addition of a neutral salt to a dilute aqueous hyaluronidase solution containing a stabilizing agent capable of forming complexes with heavy metals has been found to additionally enhance the stability of hyaluronidase. Neutral salts suitable for enhancing the stabilizing effect of the stabilizing agent include sodium chloride, potassium chloride, or mixtures thereof, as well as mixtures of alkali metal phosphates such as sodium and potassium phosphate which have a neutral pH in aqueous solution and are present in the dilute aqueous solution containing hyaluronidase and the stabilizing agent in an amount such that the ionic strength of the solution is within the range of from about 0.05 to about 0.25. If the ionic strength of the solution is below about 0.05, the stability of the hyaluronidase is not substantially increased and this is probably due to the fact that proteins have a greater tendency to denature at low salt concentrations. If the ionic strength of the solution is above about 0.25, the injection of the solution into tissue results in hypertonic effects.

For the purpose of illustration the following examples are set forth to show the stabilization of hyaluronidase according to our invention but are not to be construed as limiting the spirit of the invention or its scope.

Example I

Ten cubic centimeters of aqueous solutions of hyaluronidase, each containing 150 Turbidity Reducing Units per cubic centimeter, 0.0085 gram of sodium chloride per cubic centimeter, and a metal-combining substance were allowed to stand at 37° C. for three months and then tested for activity.

The results of the series of tests are given below in tabular form, the activity after three months at 37° C. being expressed in Turbidity Reducing Units.

| Solution No. | Stabilizing Agent | Concentration of Stabilizing Agent in Grams per liter | Activity after three months at 37° C. |
|---|---|---|---|
| 1 | Alanine | 0.075 | 150 |
| 2 | Glutamine | 0.075 | 150 |
| 3 | Histidine | 0.075 | 150 |
| 4 | Proline | 0.075 | 150 |
| 5 | Sarcosine | 0.075 | 140 |
| 6 | Taurine | 0.075 | 150 |
| 7 | Ethylene diamine tetra-acetic acid disodium salt. | 0.03 | 150 |
| 8 | Ethylene diamine di-acetic acid. | 0.05 | 140 |

Example II

Ten cubic centimeter portions of an aqueous hyaluronidase solution containing 150 Turbidity Reducing Units of hyaluronidase per cubic centimeter, glycine as a metal-combining substance in varying amounts, and sodium chloride in varying amounts, were allowed to stand for six months at 37° C. and tested for activity after three months and six months at that temperature. The results of the series of tests are given below in tabular form; the activity after three and six months being expressed in Turbidity Reducing Units.

| Solution No. | Concentration of Glycine in grams per liter | Molarity of Solution with respect to Glycine | Concentration of Sodium Chloride in grams per liter | Activity after 3 months at 37° C. | Activity after 6 months at 37° C. |
|---|---|---|---|---|---|
| 1 | 5.625 | 0.075 | 8.5 | 150 | 150 |
| 2 | 7.5 | 0.1 | 8.5 | 150 | 140 |
| 3 | 1.5 | 0.02 | 8.5 | 150 | 100 |
| 4 | 15.0 | 0.2 | 8.5 | 0 | |
| 5 | 0 | 0 | 0 | 0 | |
| 6 | 0 | 0 | 8.5 | 100 | 0 |
| 7 | 1.5 | 0.02 | 0 | 0 | |

In all instances the procedure for testing the aqueous hyaluronidase solutions for activity conformed to that of Madinaveitia and Quibell, Biochemical Journal, volume 34, page 625 (1940), and volume 35, page 456 (1941), one reducing unit being represented by a preparation of which one milligram will reduce the viscosity of hyaluronic acid to one-half its initial viscosity in 20 minutes.

What is claimed is:

1. A stabilized aqueous hyaluronidase solution containing as a stabilizer a water-soluble, metal-combining substance selected from the group consisting of amino acids, diglycine, triglycine, glycol-glycine amide, sarcosine, betaine, taurine, ethylene diamine diacetic acid, ethylene diamine tri-acetic acid, and ethylene diamine tetra-acetic acid having a stability constant for metals greater than that of hyaluronidase and a solubility in water and isotonic saline solution sufficient to provide a solution thereof having a molarity with respect thereto of from about 0.2 to about 0.1; and a neutral salt in an amount such that the ionic strength of the solution is within the range of about 0.05 to 0.25.

2. A stabilized hyaluronidase solution according to claim 1 in which the metal-combining substance is an amino acid.

3. A stabilized hyaluronidase solution according to claim 1 in which the metal-combining substance is triglycine.

4. A stabilized hyaluronidase solution according to claim 1 in which the metal-combining substance is ethylene diamine diacetic acid.

5. A stabilized hyaluronidase solution according to claim 1 in which the metal-combining substance is glycine, and is present at a concentration such that the molarity of the solution with respect thereto is 0.075 and the neutral salt is sodium chloride in a concentration such that the molarity with respect thereto is 0.15.

References Cited in the file of this patent

FOREIGN PATENTS 651,545    Great Britain _____ Apr. 4, 1951

OTHER REFERENCES

Schwartzman: Jour. of Pediatrics, vol. 33, No. 3, September 1948, pp. 267–273.

McCullagh et al.: Proc. Soc. Exp. Biol. and Med., 71, 1949, pp. 295–298.

Morrison: Science, vol. 115, March 21, 1952, pp. 310, 167–73.

Meyer et al.: Jour. Biol. Chem., vol. 188, 1951, pp. 485–490.